(12) United States Patent
Noguchi (10) Patent No.: US 11,795,871 B2
(45) Date of Patent: Oct. 24, 2023

(54) TWO-STROKE INTERNAL COMBUSTION ENGINE AND ENGINE WORKING MACHINE

(71) Applicant: YAMABIKO CORPORATION, Tokyo (JP)

(72) Inventor: Masanori Noguchi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/905,182

(22) PCT Filed: Feb. 15, 2021

(86) PCT No.: PCT/JP2021/005491
§ 371 (c)(1),
(2) Date: Aug. 29, 2022

(87) PCT Pub. No.: WO2021/177010
PCT Pub. Date: Sep. 10, 2021

(65) Prior Publication Data
US 2023/0133431 A1  May 4, 2023

(30) Foreign Application Priority Data

Mar. 2, 2020  (JP) .................................. 2020-034899

(51) Int. Cl.
*F02B 25/00* (2006.01)
*F02B 75/02* (2006.01)
(Continued)

(52) U.S. Cl.
CPC .............. *F02B 75/02* (2013.01); *F02B 25/06* (2013.01); *F02D 41/401* (2013.01); *F02F 3/24* (2013.01); *F02B 2075/025* (2013.01)

(58) Field of Classification Search
CPC .. F02B 33/04; F02B 25/14; F02F 1/22; F02M 35/1019; F02M 23/03; F02M 69/10
(Continued)

(56) References Cited

U.S. PATENT DOCUMENTS

| 6,295,956 B1* | 10/2001 | Kato ..................... F02B 61/045 |
| | | 123/193.5 |
| 6,817,323 B2* | 11/2004 | Notaras .................. F02B 25/22 |
| | | 123/73 A |
| 2019/0323418 A1* | 10/2019 | Naegele .................. F02B 25/02 |

FOREIGN PATENT DOCUMENTS

| JP | S59152159 U | 10/1984 |
| JP | H3260373 A | 11/1991 |

(Continued)

OTHER PUBLICATIONS

International Search Report in PCT/JP2021/005491, dated Apr. 20, 2021. 6pp.

*Primary Examiner* — Long T Tran
*Assistant Examiner* — James J Kim
(74) *Attorney, Agent, or Firm* — HAUPTMAN HAM, LLP (57) ABSTRACT

Provided is a two-stroke internal combustion engine, including: a fuel injection valve configured to supply a fuel into a crank chamber; an intake passage configured to allow only air to be sucked thereinto under a negative pressure generated when a piston is actuated; and a scavenging passage that allows communication between the crank chamber and a combustion chamber. Further, air passing through the intake passage is introduced into the scavenging passage, and air stagnant in the scavenging passage at end of air suction contributes to scavenging.

19 Claims, 6 Drawing Sheets

(51) Int. Cl.
  *F02B 25/06* (2006.01)
  *F02D 41/40* (2006.01)
  *F02F 3/24* (2006.01)
(58) Field of Classification Search
  USPC .................................................. 123/65 PE
  See application file for complete search history.

(56) References Cited

FOREIGN PATENT DOCUMENTS

| | | | |
|---|---|---|---|
| JP | 2000213356 | A | 8/2000 |
| JP | 2000283008 | A | 10/2000 |
| WO | 9857053 | A1 | 12/1998 |
| WO | 2007077826 | A1 | 7/2007 |

\* cited by examiner

TWO-STROKE INTERNAL COMBUSTION ENGINE AND ENGINE WORKING MACHINE

RELATED APPLICATIONS

The present application is a National Phase of International Application No. PCT/JP2021/005491 filed Feb. 15, 2021, which claims priority to Japanese Patent Application No. 2020-034899, filed Mar. 2, 2020.

TECHNICAL FIELD

This disclosure relates to a two-stroke internal combustion engine and an engine working machine using the two-stroke internal combustion engine as a power source.

BACKGROUND ART

A two-stroke internal combustion engine is often used as a power source in portable working machines such as brush cutters, chain saws, and power blowers. In the two-stroke internal combustion engine, air and a fuel are mixed in a carburetor to generate an air-fuel mixture, and the air-fuel mixture is sucked into a crank chamber. The two-stroke internal combustion engine includes a scavenging passage that allows communication between the crank chamber and a combustion chamber. When a piston is actuated in a cylinder, the air-fuel mixture having been pre-compressed in the crank chamber is introduced into the combustion chamber through the scavenging passage, and scavenging is performed with the air-fuel mixture.

The two-stroke internal combustion engine has a well-known problem of "air-fuel mixture (fresh gas) blow-by". Specifically, the air-fuel mixture for scavenging introduced into the combustion chamber is directly discharged from an exhaust port of the cylinder. The air-fuel mixture blow-by leads to a waste of fuel, and may cause air pollution.

To solve this problem, there has been known a so-called "stratified scavenging two-stroke engine", which is configured to allow air and an air-fuel mixture to be introduced into a cylinder in the stated order as gases to be introduced thereinto (Republication of PCT International Publication No. 98/057053). The stratified scavenging two-stroke engine of this technology includes an air supply intake passage and an air-fuel mixture supply intake passage. Air is supplied to an upper part of a scavenging passage and an air-fuel mixture is supplied to a crankcase through a reciprocating operation of a piston inside the cylinder. As a result, the air stagnant in the upper part of the scavenging passage contributes to scavenging so that blow-by is reduced with use of so-called "leading air".

With this configuration, supply amounts and timing of both of the leading air and the air-fuel mixture is determined dependently on a negative pressure generated in a combustion chamber and the amount of air stagnant in the upper part of the scavenging passage, and thus cannot be precisely controlled. As an idea, a countermeasure plan of, for example, appropriately setting a sectional area of each of intake passages for the leading air and the air-fuel mixture to adjust a ratio of air and the air-fuel mixture in intake air may be employed to define a supply ratio of the leading air and the air-fuel mixture. However, even the above-mentioned countermeasure does not enable such precise control as to achieve an optimal supply ratio over the entire operating range with a wide speed range. Further, to prevent damage to the engine, the air-fuel mixture supply amount is inevitably set larger (with a richer air-fuel mixture) to maintain stability of an operation over the entire speed range.

Further, the two-stroke internal combustion engine is widely used for portable working machines. For its features, the two-stroke internal combustion engine is not only used in a high-speed and high-load range but also often used for acceleration/deceleration between low and high speed, at an intermediate speed, or in a light-load range. In such a two-stroke internal combustion engine, it is also desired to supply the leading air and the air-fuel mixture that are most suitable for the operating state of the engine to the combustion chamber. More specifically, for example, accurate control of a leading air amount and an air-fuel mixture amount under various operating states as described above, setting a sufficient leading-air supply amount without depending on an air-fuel mixture supply amount required for each of the operating ranges of the engine, and maintaining compactness of the engine are demanded.

Solution to Problem

This disclosure has been made in view of the circumstances described above, and has an object to provide a two-stroke internal combustion engine that prevents air-fuel mixture blow-by at a time of scavenging and allows an air-fuel mixture suitable for an operating state of the engine to be supplied to a combustion chamber.

This disclosure has another object to provide an engine working machine including the two-stroke internal combustion engine as a power source.

In order to solve the problems described above, according to this disclosure, there is provided a two-stroke internal combustion engine, including: a cylinder, which defines a combustion chamber, and has an exhaust port; an ignition device configured to ignite an air-fuel mixture in the combustion chamber; a piston configured to reciprocate inside the cylinder through combustion and expansion that occur in the combustion chamber; a crank chamber communicating with an interior of the cylinder; a crankshaft, which is disposed in the crank chamber, and is operationally coupled to the piston; a fuel injection valve configured to inject a fuel into the crank chamber; an intake passage configured to allow only air to be sucked thereinto under a negative pressure generated when the piston is actuated; and a scavenging passage that allows communication between the crank chamber and the combustion chamber, wherein air passing through the intake passage is introduced into the scavenging passage, and air stagnant in the scavenging passage at end of air suction contributes to scavenging.

According to this disclosure, the fuel is injected into the crank chamber by the fuel injection valve. Further, the air passing through the intake passage is introduced into the scavenging passage. The air introduced into the scavenging passage is sucked into the crank chamber. At the end of air suction, the air stagnates in the scavenging passage. The air that has been introduced into the crank chamber through the scavenging passage is mixed with the fuel to generate an air-fuel mixture. The air-fuel mixture in the crank chamber is introduced into the combustion chamber through the scavenging passage by actuating the piston. The air-fuel mixture in the combustion chamber is compressed by the piston, and is ignited by the ignition device to cause combustion and expansion. Scavenging and discharge are achieved while the piston is being pushed back by the combustion and expansion. Specifically, the air stagnant in the scavenging passage is pressure-fed into the combustion chamber, and contributes to the scavenging. Through the scavenging, the combustion gas is discharged from the exhaust port.

As described above, according to this disclosure, the fuel is supplied to the crank chamber by the fuel injection valve, thus fuel supply timing can easily be controlled, thereby enabling supply of the air-fuel mixture suitable for an operating state of the engine. Further, only air is sucked into the intake passage, and the air passing through the intake passage is introduced into the scavenging passage, thus the intake passage can be formed in a simple manner. The intake passage that allows only air to be sucked thereinto not only facilitates control of the intake air but also contributes to improvement of reliability of air control. At the end of air suction, the air stagnates in the scavenging passage, and since this air contributes to the scavenging, thus air-fuel mixture blow-by, which may occur at the time of scavenging, is prevented. As a result, an exhaust gas is improved in components thereof.

Further, according to this disclosure, since only an air passage is required to be arranged on an intake side, an intake passage and an intake port for air-fuel mixture supply, which have been provided and formed in a related-art stratified scavenging engine, are not required. Thus, the cylinder, a manifold, and other components can be formed in a simple manner. This configuration simplifies an air control valve to contribute to facilitation and improvement of reliability of control of an intake air amount. More specifically, a related-art cylinder is required to have a configuration in which an air port and an air-fuel mixture port are arranged vertically or in a circumferential direction. Meanwhile, according to this disclosure, since a port for air-fuel mixture supply is not required, a degree of freedom in design of a port opening in the cylinder is remarkably improved.

As one embodiment, the piston may have a piston groove, and an intake port and the scavenging passage may communicate with each other via the piston groove. In this case, since the intake port is opened and closed by the piston, it is not necessary to dispose a check valve.

As one embodiment, the piston groove may have a hole that allows communication with the crank chamber. In this case, air also flows from the intake port into the crank chamber through the hole and an air supply amount to the crank chamber can be increased.

As one embodiment, a communication portion, which is defined between a lower end of the piston and a lower end of the intake port, and allows communication between the intake passage and the crank chamber may be provided. In this case, air also flows from the intake port into the crank chamber through the communication portion and an air supply amount to the crank chamber can be increased.

As one embodiment, a cutout may be defined in a lower end of the piston, and the communication portion may be formed by the cutout. In this case, air flows from the intake port into the crank chamber through the cutout.

As one embodiment, an enlarged portion being enlarged in a downward direction may be provided at a lower end of the intake port, and the communication portion may be formed by the enlarged portion. In this case, air flows from the intake port into the crank chamber through the enlarged portion.

As one embodiment, the scavenging passage may have a branch passage communicating with the piston groove, and the branch passage may be closer to the crank chamber than a scavenging port is. In this case, since air flows from the intake port into the crank chamber through the branch passage, the air supply amount to the crank chamber can be increased.

As one embodiment, the fuel injection valve may be configured to inject the fuel in such a direction as to avoid hinderance of inflow of air into the crank chamber.

As one embodiment, the fuel injection valve may include a high-pressure fuel injection valve configured to receive a fuel pressure from at least one of an electrically-driven fuel pump or a pump configured to operate through rotation of the crankshaft. This high-pressure fuel injection valve enables the fuel injection to an aimed position.

As one embodiment, the fuel injection valve may be configured to inject the fuel at high pressure toward an area required to be cooled in the cylinder or the crank chamber. This configuration allows the area required to be cooled to be effectively cooled with the fuel injected from the fuel injection valve at high pressure.

As one embodiment, the fuel injection valve may include a high-pressure fuel injection valve capable of injecting the fuel when the crank chamber has a maximum internal pressure while the piston is being actuated. The use of the high-pressure fuel injection valve enables optimization of timing of fuel injection into the crank chamber. Thus, for example, fuel is prevented from being mixed with the stagnant air in the scavenging passage, and hence the exhaust gas is improved in components thereof.

As one embodiment, the intake passage may have an opening coupled to only one intake port. In this manner, in comparison to a related-art configuration having an air-fuel mixture port and two air ports, the intake passage can be formed in a simple manner, which significantly contributes to compactness of the working machine.

As one embodiment, a booster passage connecting the crank chamber and the combustion chamber is arranged separately from the scavenging passage, and fuel supply timing of the fuel injection valve may be controlled by a control device to achieve homogenous combustion during a full-load operation and to allow the fuel to flow into the combustion chamber through the booster passage to achieve stratified combustion during a light-load operation. In this case, the homogenous combustion is set to occur during the full-load operation, and the stratified combustion is set to occur during the light-load operation. In this manner, thermal efficiency is improved not only during the full-load operation but also during the light-load operation.

As one embodiment, a bottom dead center-side booster port that allows communication between the crank chamber and the booster passage may be provided, and a fuel supply configuration that allows the fuel supplied from the fuel injection valve to be introduced to a vicinity of the bottom dead center-side booster port during the light-load operation may be provided. In this case, since the fuel supplied from the fuel injection valve is introduced (flows) into the vicinity of the bottom dead center-side booster port during the light-load operation, the fuel easily flows into the combustion chamber through the booster passage. Meanwhile, air is introduced from the scavenging passage into the combustion chamber, and the air and the air-fuel mixture are introduced from different passages, which is suitable for the stratified combustion during the light-load operation.

As one embodiment, the fuel supply configuration may include both of a first configuration that allows the fuel injection valve to be arranged in the vicinity of the bottom dead center-side booster port and a second configuration that allows the fuel to be injected from the fuel injection valve at such an injection pressure that the fuel is allowed to reach and stay in the vicinity of the bottom dead center-side booster port.

As one embodiment, the fuel supply configuration may include both of a first configuration that allows the fuel injection valve to be arranged so that the fuel is injected toward the bottom dead center-side booster port and a second configuration that allows the fuel to be injected from the fuel injection valve at such an injection pressure that the fuel is allowed to reach the bottom dead center-side booster port.

As one embodiment, the fuel may be supplied from the fuel injection valve at timing at which the piston is positioned in a vicinity of a top dead center during the full-load operation, and the fuel may be supplied from the fuel injection valve at timing immediately before the piston reaches a vicinity of a bottom dead center during the light-load operation. In this manner, homogeneity of the air-fuel mixture in the crank chamber is improved during the full-load operation, which is suitable for the homogenous combustion. Meanwhile, during the light-load operation, the fuel supplied by the fuel injection valve flows into the combustion chamber through the booster passage before being mixed with the air supplied to the crank chamber. Since the air supplied to the crank chamber is introduced from the scavenging passage into the combustion chamber without being mixed with the fuel, it is suitable for stratified combustion.

As one embodiment, a pair of scavenging ports, which allow communication between the scavenging passage and the combustion chamber, may be arranged in an inner peripheral surface of the cylinder, and the exhaust port may be arranged on one arc-shaped surface side between the pair of scavenging ports, and a top dead center-side booster port that allows communication between the combustion chamber and the booster passage may be arranged on another arc-shaped surface side between the pair of scavenging ports. In this case, during the light-load operation, the fuel flows into the combustion chamber through the booster passage, and the air flows into the combustion chamber from the pair of scavenging ports. A rich air-fuel mixture flows from the booster port for air-fuel mixture supply, which is formed separately from the scavenging passage, mixes with the air in the combustion chamber. As a result, a rich air-fuel mixture is generated in the vicinity of a spark portion of the ignition device. In this manner, stability of the stratified combustion during the light-load operation is improved.

As described above, according to this disclosure, the leading air and the air-fuel mixture that are most suitable for the operating state of the engine can be supplied to the combustion chamber not only when the two-stroke internal combustion engine operates in a high-speed and high-load range but also when the two-stroke internal combustion engine accelerates or decelerates between low and high speed, operates at an intermediate speed, or operates in the light-load range. Further, a combination of the arrangement of the fuel injection device, timing control, and directivity allows accurate control of each of a leading air amount and an air-fuel mixture amount. Since the cylinder has only the air port for sucking air, a sufficient leading air supply amount can be set, and contributes to simplification and compactness of an intake-side (counter-exhaust side) structure of the engine.

As one embodiment, a check valve may be provided in the intake passage. When the check valve is provided, it is possible to prevent the blow-back from the combustion chamber in a previous cycle from being mixed into the intake passage, and the air supply amount and the fuel injection amount in a subsequent cycle can be more precisely managed.

As one embodiment, an engine working machine including the two-stroke internal combustion engine as a power source may be provided.

BRIEF DESCRIPTION OF DRAWINGS

FIGS. 8A to 8C are explanatory views for illustrating a two-stroke internal combustion engine according to another embodiment of this disclosure during a full-load operation, in which

FIGS. 9A and 9B are explanatory views for illustrating the two-stroke internal combustion engine of FIGS. 8A to 8C during a light-load operation, in which

DESCRIPTION OF EMBODIMENTS

Now, with reference to the accompanying drawings, a description is given of the embodiments of this disclosure.

A two-stroke internal combustion engine (hereinafter simply referred to as "engine") according to this disclosure is of air-cooled type to be mainly mounted in a portable engine working machine as a power source. Examples of a working machine in which the engine of this disclosure is used include a handheld, shoulder hanging, or backpack type portable working machine such as a chain saw, a brush cutter, a power cutter, a hedge-trimmer, and a power blower.

Figure 1:
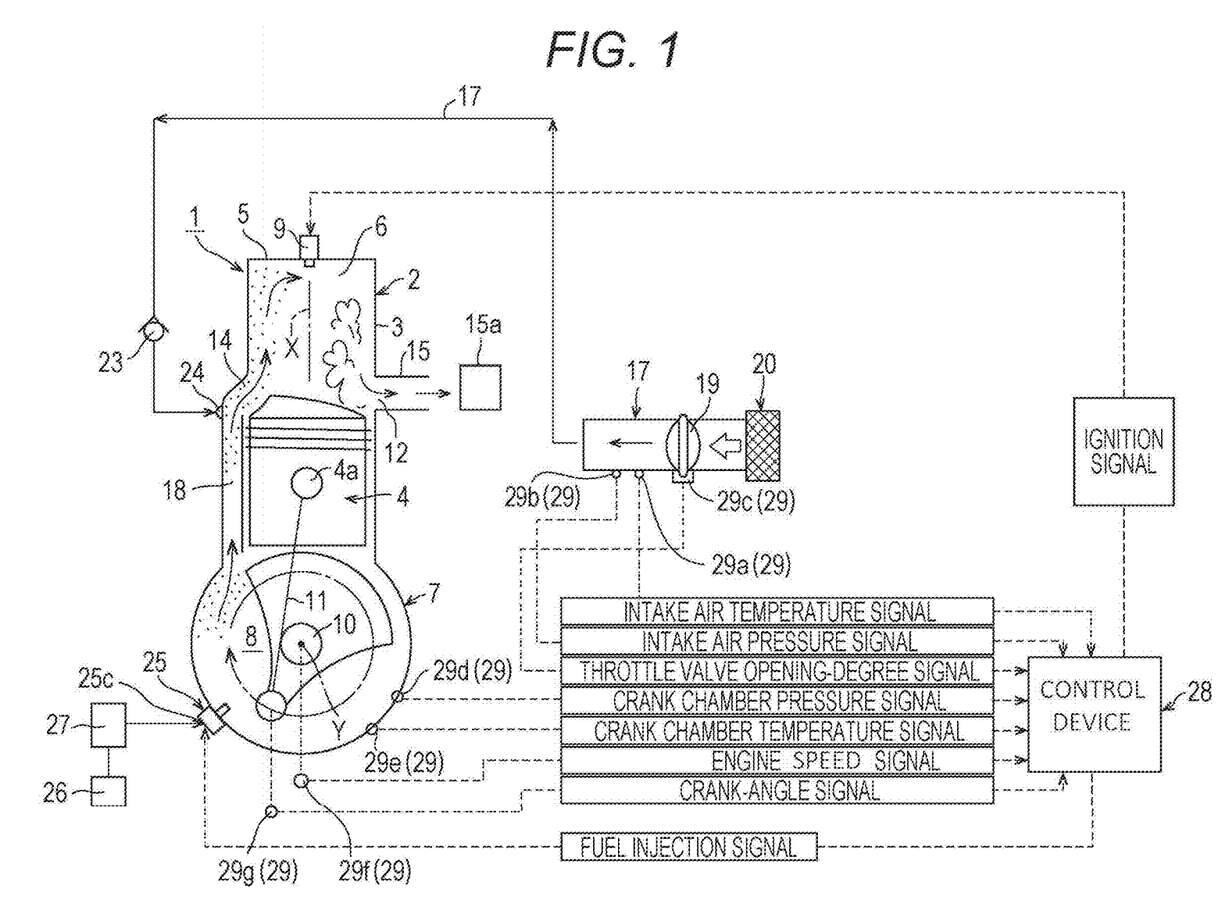
FIG. 1 is a schematic view of a two-stroke internal combustion engine according to one embodiment of this disclosure.

As illustrated in FIG. 1, an engine 1 according to one embodiment of this disclosure includes a cylinder block 2 and a piston 4. The piston 4 slidably reciprocates inside a cylinder 3 forming the cylinder block 2. A cylinder head 5, which forms one end side of the cylinder block 2, and the piston 4 define a combustion chamber 6. A crankcase 7, which forms another end side of the cylinder block 2, and the piston 4 define a crank chamber 8. A spark plug 9 forming to an ignition device is firmly fixed to the cylinder head 5. The spark plug 9 projects into the combustion chamber 6. A crankshaft 10 is pivotably supported in the crankcase 7. The crankshaft 10 and a piston pin 4a of the piston 4 are coupled to each other with a connecting rod 11. Combustion and expansion (explosion) in the combustion chamber 6 cause the piston 4 to slidably reciprocate inside the cylinder 3. The reciprocation of the piston 4 rotationally drives the crankshaft 10 through the connecting rod 11, and a rotational driving force is output to an output shaft (not shown) connected to the crankshaft 10.

An exhaust port 12 and at least one scavenging port 14 are open on an inner wall of the cylinder 3. These ports 12 and 14 are controlled to be opened and closed at predetermined timing through the reciprocation of the piston 4. The exhaust port 12 communicates with a muffler 15a via an exhaust pipe 15. The scavenging port 14 communicates with the crank chamber 8 via a scavenging passage 18.

The engine 1 includes an air supply intake passage 17. Only air is sucked into the intake passage 17 under a negative pressure generated when the piston 4 is actuated. A throttle valve 19 such as a butterfly throttle valve is disposed in the intake passage 17, and an air cleaner 20 is disposed on an upstream side of the throttle valve 19. When an output operating member (such as a throttle trigger or a throttle lever) of a working machine is operated by an operator, an opening degree of the throttle valve 19 is adjusted.

The intake passage 17 communicates with the scavenging passage 18. A check valve 23 that prevents backflow of air from the scavenging passage 18 is disposed in the intake passage 17. The intake passage 17 is coupled to an intake port 24 formed at an end of the scavenging passage 18 on the scavenging port 14 side. The intake passage 17 guides the air that has been purified in the air cleaner 20 to the scavenging passage 18. The intake passage 17 has an opening coupled to only one intake port 24.

The air that has been purified in the air cleaner 20 passes from the intake passage 17 through the check valve 23, the intake port 24, and the scavenging passage 18 in the stated order to be sucked into the crank chamber 8 during an intake stroke in which a pressure in the crank chamber 8 becomes negative. At the end of the intake stroke, the air stagnates in the scavenging passage 18. During a scavenging stroke, the stagnant air flows from the scavenging port 14 into the cylinder 3 before the air-fuel mixture in the crank chamber 8 flows thereinto. As a result of the leading-air scavenging, a combustion gas in the combustion chamber 6 is discharged from the exhaust port 12.

The engine 1 includes a fuel injection valve 25 for supplying a fuel into the crank chamber 8. In the illustrated example, the fuel injection valve 25 is disposed at a lower part of the crank case 7.

A fuel tank 26 and a fuel pump 27 are coupled to the fuel injection valve 25. When the fuel pump 27 is actuated, the fuel in the fuel tank 26 is supplied to the fuel injection valve 25, and the injection of the fuel is controlled by opening and closing the fuel injection valve 25.

The fuel injection valve 25 is controlled to be opened and closed by a control device 28 including a microcomputer. A detection signal from at least one sensor 29 (29a to 29g) that detects an operating condition of the engine 1 is input to the control device 28. The control device 28 controls the fuel supply from the fuel injection valve 25 to the crank chamber 8 based on the detection performed by the sensor 29.

Examples of the at least one sensor 29 include, for example, an intake air temperature sensor 29a, an intake air pressure sensor 29b, a throttle valve opening-degree sensor 29c, a crank chamber pressure sensor 29d, a crank chamber temperature sensor 29e, an engine speed sensor 29f, and a crank angle sensor 29g. The intake air temperature sensor 29a detects an intake air temperature, and sends out a signal. The intake air pressure sensor 29b detects an intake air pressure, and sends out a signal. The throttle valve opening-degree sensor 29c detects an opening degree of the throttle valve 19, and sends out a signal. The crank chamber pressure sensor 29d detects a pressure in the crank chamber 8, and sends out a signal. The crank chamber temperature sensor 29e detects a temperature in the crank chamber 8, and sends out a signal. The engine speed sensor 29f detects a speed of the engine 1, and sends out a signal. The crank angle sensor 29g detects a crank angle, and sends out a signal. The signals from these sensors 29a to 29g are input to the control device 28.

The control device 28 sends out a fuel injection signal to the fuel injection valve 25 at appropriate timing and sends out an ignition signal to the spark plug 9 forming the ignition device at predetermined timing in accordance with a predetermined program based on various signals from the sensors 29a to 29g. In this manner, the fuel supply to the crank chamber 8 and ignition of the air-fuel mixture in the combustion chamber 6 are achieved.

Next, an operation of the engine 1 of FIG. 1 is described with reference to FIGS. 2A to 2D. In FIGS. 2A to 2D, FIG. 2A is an explanatory view for illustrating an operation at a time of scavenging, FIG. 2B is an explanatory view for illustrating an operation at a time of intake and compression, FIG. 2C is an explanatory view for illustrating an operation at a time of combustion and expansion (explosion), and FIG. 2D is an explanatory view for illustrating an operation at a time of discharge. The fuel injection to the crank chamber 8 is only required to be performed at an appropriate time. As an example, the fuel injection is set to occur in a final phase of the intake stroke.

Figure 2A:
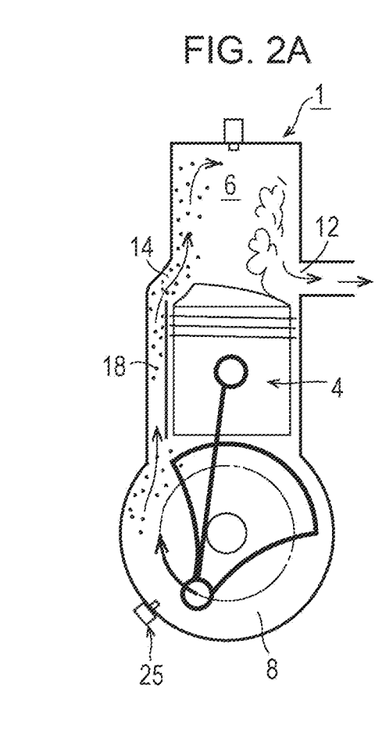
FIGS. 2A to 2D are explanatory views for illustrating working strokes of an engine of FIG. 1.
Figure 2B:
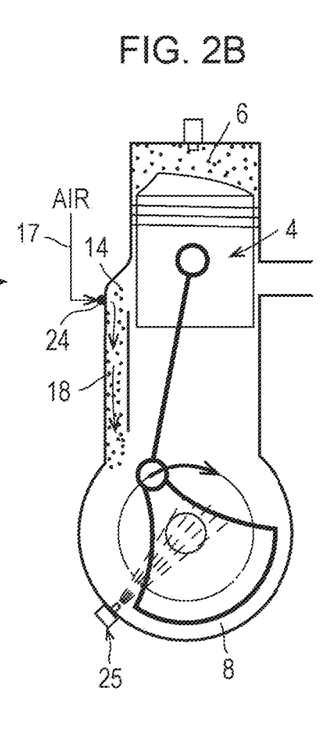
Figure 2C:
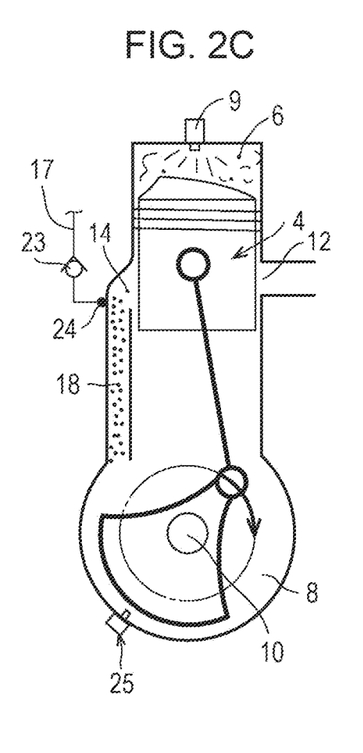
Figure 2D:
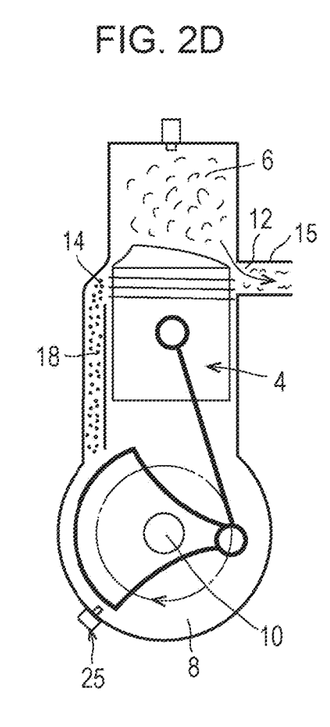

As illustrated in FIG. 2A and FIG. 2B, when the scavenging port 14 is closed by the piston 4 in a process in which the piston 4 is moving up from a bottom dead center, the pressure in the crank chamber 8 becomes negative due to the upward movement of the piston 4. In this manner, air is sucked from the intake passage 17 through the intake port 24 and the scavenging passage 18 into the crank chamber 8. As an example, the fuel is injected from the fuel injection valve 25 in the final phase of the intake stroke. The air-fuel mixture is compressed in the combustion chamber 6 until the piston 4 reaches a top dead center. When the piston 4 reaches the top dead center, the suction of air into the crank chamber 8 ends. At this time, the crank chamber 8 is filled with the air-fuel mixture corresponding to a mixture of a fuel and air, and air is stagnant in the scavenging passage 18.

As illustrated in FIG. 2C, when the piston 4 reaches the top dead center, ignition is performed by the spark plug 9. The ignition causes combustion and expansion (explosion) of the air-fuel mixture in the combustion chamber 6 to push down the piston 4 to the bottom dead center. As a result, the crankshaft 10 is rotated to generate power. With the piston 4 moving down, the air-fuel mixture in the crank chamber 8 is pre-compressed. At this time, the check valve 23 acts. Thus, air does not flow out from the intake port 24.

As illustrated in FIG. 2D, when the exhaust port 12 is opened as a result of downward movement of the piston 4, a combustion gas flows out to the exhaust pipe 15. Subsequently, as illustrated in FIG. 2A, the scavenging port 14 is opened to allow the pre-compressed air-fuel mixture in the crank chamber 8 to be sent into the combustion chamber 6 through the scavenging passage 18. At this time, the stagnant air in the scavenging passage 18 flows into the combustion chamber 6 as leading air before the air-fuel mixture in the crank chamber 8 flows thereinto, and pushes the combustion gas to the exhaust port 12. Thus, blow-by of the air-fuel mixture at the time of scavenging is reduced. The piston 4 moves toward the top dead center again through the rotation of the crankshaft 10. After that, the same actions are repeated.

Figure 3:
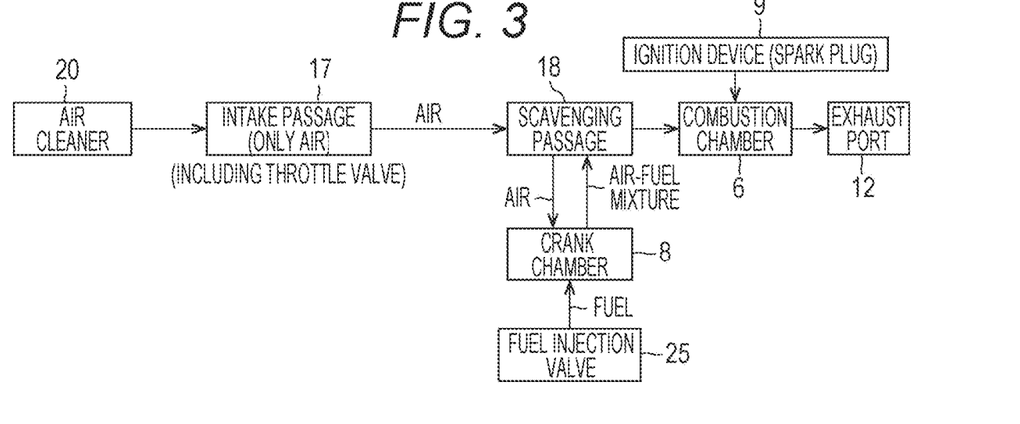
FIG. 3 is a block diagram for illustrating flows of air and a fuel in the engine of FIG. 1.

Flows of the air and the fuel in the engine 1 of FIG. 1 can be simplified as illustrated in a block diagram of FIG. 3.

In the engine 1 according to this embodiment, the fuel is supplied to the crank chamber 8 by the fuel injection valve 25. Thus, timing of the fuel supply can easily be controlled, thereby enabling the supply of the air-fuel mixture suitable for the operating condition of the engine 1. Further, air stagnates in the scavenging passage 18 at the end of the air suction, and the stagnant air serves as leading air to contribute to scavenging. Thus, air-fuel mixture air blow-by, which may occur at the time of scavenging, is prevented. As a result, an exhaust gas is improved in components thereof. The intake passage 17 is configured to allow only air to be sucked thereinto. This configuration not only facilitates control of intake air but also contributes to improvement of reliability of air control. Further, the intake passage 17 communicates with the scavenging passage 18 via the check valve 23. Thus, this configuration contributes to simplification of the piston 4 and the scavenging passage 18.

A mode in which the fuel injection valve 25 is disposed and a kind of the fuel injection valve 25 may be determined, for example, as follows.

As a suitable one embodiment, the fuel injection valve 25 may be configured to inject the fuel in a direction that avoids the scavenging passage 18. In this manner, the fuel is less liable to be mixed with the stagnant air in the scavenging passage 18.

As a suitable one embodiment, the fuel injection valve 25 may include a high-pressure fuel injection valve configured to receive a fuel pressure from at least one of an electrically-driven fuel pump or a pump configured to operate through rotation of the crankshaft 10. This high-pressure fuel injection valve enables the fuel injection to an aimed position. For example, the fuel injection can be aimed at a position in the engine 1 where seizure is liable to occur.

As a suitable one embodiment, the fuel injection valve 25 may be configured to inject the fuel at high pressure toward an area required to be cooled in the cylinder 3 or the crank chamber 8. This configuration allows the area required to be cooled to be effectively cooled with the fuel injected from the fuel injection valve 25 at high pressure. An example of the area required to be cooled includes an area where frictional heat is generated, such as a coupling portion between the connecting rod 11 and the piston pin 4$a$ or a coupling portion between the connecting rod 11 and the crankshaft 10. Further, the fuel may be injected at high pressure against an inner wall of the piston 4 so as to cool the piston 4.

A mixed fuel containing gasoline and lubricating oil mixed therewith is used as a fuel for a two-stroke internal combustion engine. Thus, when the fuel (mixed fuel) is supplied to the crank chamber 8, lubrication between the piston 4 and the cylinder 3 is readily and quickly achieved with the lubricating oil contained in the fuel. The lubrication also prevents the seizure of the engine 1. In this case, the seizure of the engine 1 may be prevented by the fuel injection based on at least one of a temperature signal, a speed signal, an intake air pressure signal, or an opening-degree signal. For example, a fuel may be injected when a high temperature is detected during a high-speed operation. Also when a sudden stop is made during a high-speed operation, a fuel may be injected to prevent the seizure.

As a suitable one embodiment, the fuel injection valve 25 may include a high-pressure fuel injection valve capable of injecting the fuel when the crank chamber 8 has a maximum internal pressure while the piston 4 is being actuated. The use of the high-pressure fuel injection valve enables optimization of timing of fuel injection into the crank chamber. Thus, for example, gasoline is prevented from being mixed with the leading air, and hence the exhaust gas is improved in components thereof.

As a suitable one embodiment, as illustrated in FIG. 1, the fuel injection valve 25 may be installed on a side where a fuel tank 26 is arranged with respect to a plane containing an axis X of the cylinder 3 and an axis Y of the crankshaft 10. This configuration allows the fuel tank 26 and the fuel injection valve 25 to be positioned closer to each other. Thus, a pipe provided between the fuel tank 26 and the fuel injection valve 25 requires only a short length, which further contributes to reduction in size and weight of the working machine. Further, when the fuel injection valve 25 is disposed so that a fuel inlet 25$c$ of the fuel injection valve 25 faces the fuel tank 26, a pipe extending from the fuel tank 26 to the fuel injection valve 25 can easily be provided. Further, in this case, a fuel can be rapidly fed to the fuel injection valve 25 because of a short distance between the fuel tank 26 and the fuel injection valve 25. Thus, the engine 1 can be started in a desirable manner. In particular, in a case of a high-pressure fuel injection valve that is used together with an electrically-driven fuel pump installed in the fuel tank 26, the distance between the electrically-driven fuel pump and the fuel injection valve 25 is short, the fuel can be quickly fed to thereby start the engine 1 in a desirable manner.

As a suitable one embodiment, the fuel injection valve 25$a$ may have a fuel inlet 25$c$ at a rear end and be configured to inject the fuel upward, and a fuel tank 26 may be arranged below the crank chamber 8. Also in this case, the same actions and effects as those described above are obtained.

As the fuel injection valve 25, not only an electrically controllable one but also a mechanically controllable one may be employed. When the latter one is used, for example, a mechanically openable and closable fuel injection valve may be operationally coupled to the crankshaft 10 so that the fuel injection valve is opened and closed at predetermined timing during working strokes of the piston 4.

Figure 4A:
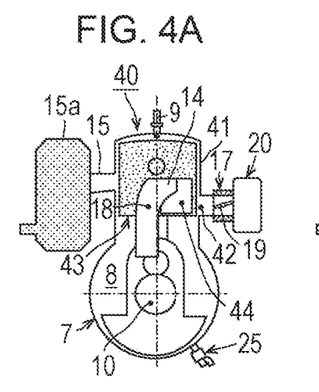
FIGS. 4A and 4B are schematic views of a two-stroke internal combustion engine according to modification embodiment of this disclosure.

Next, a modification example of FIG. 1 is described with reference to FIGS. 4A and 4B. In the following description, components which are the same as or equivalent to those in the example of FIG. 1 are denoted by the same reference symbols as those in FIG. 1, and overlapping description thereof is omitted. FIG. 4A is an illustration of a state in which the piston is located at a top dead center, and FIG. 4B is an illustration of a state in which the piston is located at a bottom dead center.

Figure 4B:
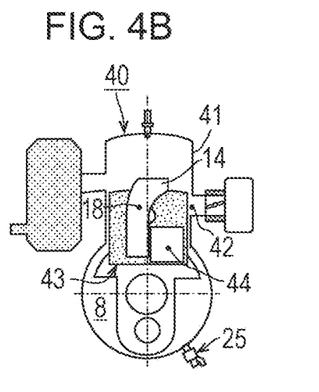

In an engine 40 of FIGS. 4A and 4B, only one intake port 42 is formed in an inner wall of a cylinder 41. An intake passage 17 communicates with the intake port 42. The intake port 42 is opened and closed by a piston 43. The piston 43 of FIGS. 4A and 4B have a piston groove 44 formed in a peripheral surface. The intake passage 17 and the scavenging port 14 communicate with each other via the piston groove 44 at predetermined timing.

In the engine 40 of FIGS. 4A and 4B, when the piston 43 is actuated toward the top dead center, a pressure in a crank chamber 8 becomes negative. Then, when the piston groove 44 and the scavenging port 14 are aligned with each other while the piston 43 is moving upward, the crank chamber 8 communicates with the intake passage 17 via the scavenging passage 18, the scavenging port 14, the piston groove 44, and the intake port 42. Thus, air is sucked into the crank chamber 8 through the intake passage 17, the intake port 42, the piston groove 44, the scavenging port 14, and the scavenging passage 18 under the negative pressure of the crank chamber 8. The sucked air comes into direct contact with the peripheral surface of the piston 43 to thereby improve cooling efficiency for the piston 43. Further, the intake port 42 is opened and closed by the piston 43. Thus, in contrast to the engine 1 of FIG. 1, a check valve is not required to be disposed in the intake passage 17.

Next, a modification example of FIGS. 4A and 4B are described with reference to FIG. 5. In the following description, components which are the same as or equivalent to those in the example of FIGS. 4A and 4B are denoted by the same reference symbols as those in FIGS. 4A and 4B, and overlapping description thereof is omitted.

Figure 5:
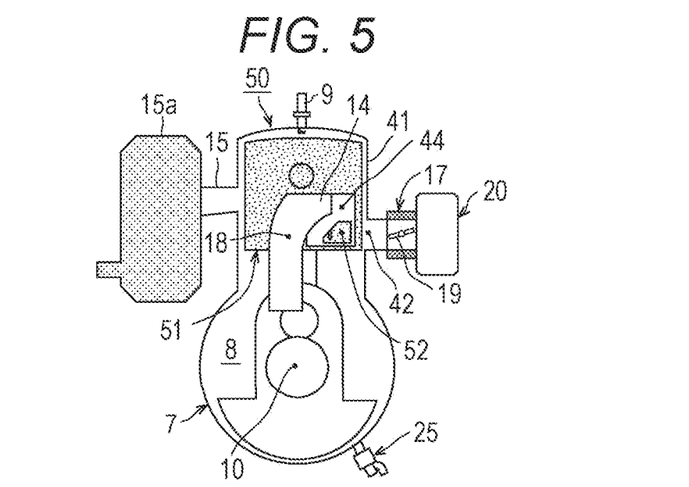
FIG. 5 is a schematic view of a two-stroke internal combustion engine according to modification embodiment of this disclosure.

In an engine 50 of FIG. 5, a piston groove 44 of a piston 51 has a hole 52 communicating with a crank chamber 8. Air also flows into the crank chamber 8 from an intake port 42 through the hole 52. Thus, an air supply amount to the crank chamber 8 can be increased.

Next, a modification example of FIGS. 4A and 4B are described with reference to FIGS. 6A and 6B. In the following description, components which are the same as or equivalent to those in the example of FIGS. 4A and 4B are denoted by the same reference symbols as those in FIGS. 4A and 4B, and overlapping description thereof is omitted.

Figures 6A, 6B:
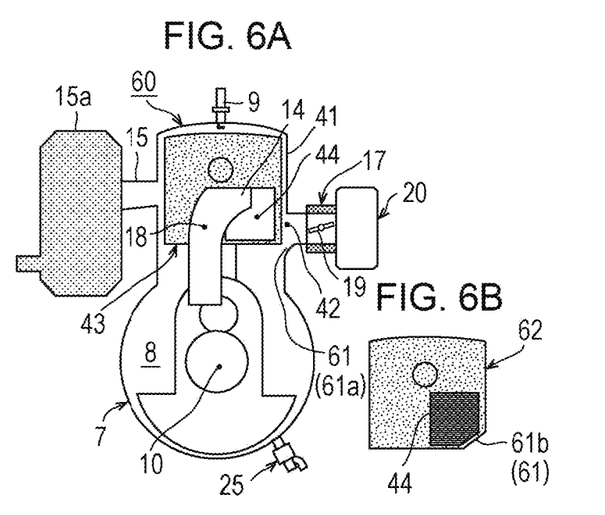
FIGS. 6A and 6B are schematic views of a two-stroke internal combustion engine according to modification embodiment of this disclosure.

An engine 60 of FIGS. 6A and 6B include a communication portion 61 defined between a lower end of a piston 43 and a lower end of an intake port 42. The communication portion 61 allows communication between an intake passage 17 and a crank chamber 8. In this case, when the piston 43 reaches a top dead center, air also flows from the intake port 42 into the crank chamber 8 through the communication portion 61. Thus, an air supply amount to the crank chamber 8 can be increased.

As an example of a mode in which the communication portion 61 is defined, as illustrated in FIG. 6A, the communication portion 61 may be formed by an enlarged portion 61a. The enlarged portion 61a is formed at the lower end of the intake port 42, and is enlarged in a downward direction. In this case, air flows from the intake port 42 into the crank chamber 8 through the enlarged portion 61a.

As another example of the communication portion 61, as illustrated in FIG. 6B, the piston 62 may have a cutout 61b at its lower end so that the communication portion 61 is formed by the cutout 61b. In this case, air flows from the intake port 42 into the crank chamber 8 through the cutout 61b.

Next, a modification example of FIGS. 4A and 4B are described with reference to FIG. 7. In the following description, components which are the same as or equivalent to those in the example of FIGS. 4A and 4B are denoted by the same reference symbols as those in FIGS. 4A and 4B, and overlapping description thereof is omitted.

Figure 7:
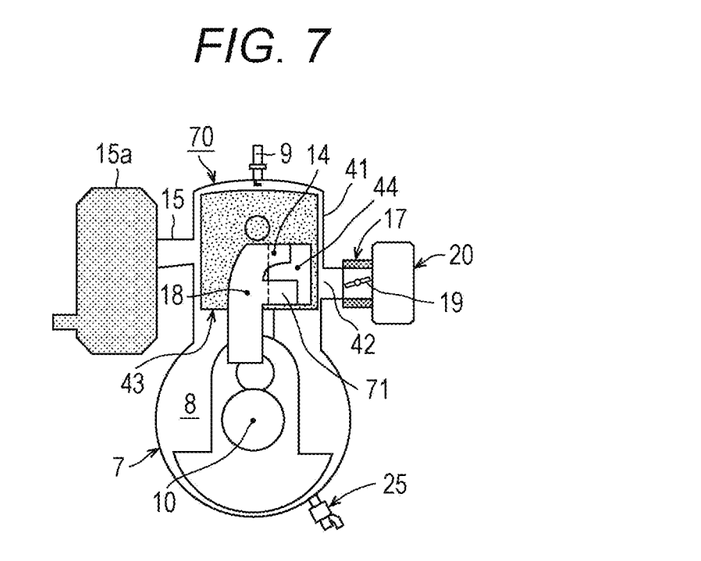
FIG. 7 is a schematic view of a two-stroke internal combustion engine according to modification embodiment of this disclosure.

In an engine 70 of FIG. 7, a scavenging passage 18 has a branch passage 71 that communicates with a piston groove 44. The branch passage 71 is closer to a crank chamber 8 than a scavenging port 14 is. In this case, the branch passage 71 is located below the scavenging port 14. Thus, time during which the piston groove 44 and the branch passage 71 communicate with each other through actuation of a piston 43 can be increased to thereby increase an air intake amount and improve an output.

Next, with reference to FIGS. 8A to 8C and FIGS. 9A and 9B, another embodiment of this disclosure is described. An example of FIGS. 8A to 8C and FIGS. 9A and 9B are an embodiment based on a modification example of the engine 40 of FIGS. 4A and 4B, which is a modification example of FIG. 1. Thus, components which are the same as or equivalent to those in the examples of FIG. 1 and FIGS. 4A and 4B are denoted by the same reference symbols, and overlapping description thereof may be omitted.

An engine 80 of FIGS. 8A to 8C and FIGS. 9A and 9B include a cylinder 41, an ignition device (spark plug 9), a piston 43, a crank chamber 8, a crankshaft 10, a fuel injection valve 25, an intake passage 17, and scavenging passages 18. The cylinder 41 defines a combustion chamber 6, and has an exhaust port 12. The ignition device ignites an air-fuel mixture in the combustion chamber 6. The piston 43 reciprocates inside the cylinder 41 through combustion and expansion that occur in the combustion chamber 6. The crank chamber 8 communicates with an interior of the cylinder 41. The crankshaft 10 is disposed in the crank chamber 8, and is operationally coupled to the piston 43. The fuel injection valve 25 injects a fuel into the crank chamber 8. The intake passage 17 supplies only air that is sucked under a negative pressure generated when the piston 43 is actuated. The scavenging passages 18 allow communication between the crank chamber 8 and the combustion chamber 6. Air passing through the intake passage 17 is introduced into the scavenging passage 18, and air stagnant in the scavenging passage 18 in a second half of an intake stroke contributes to scavenging.

Figure 8A:
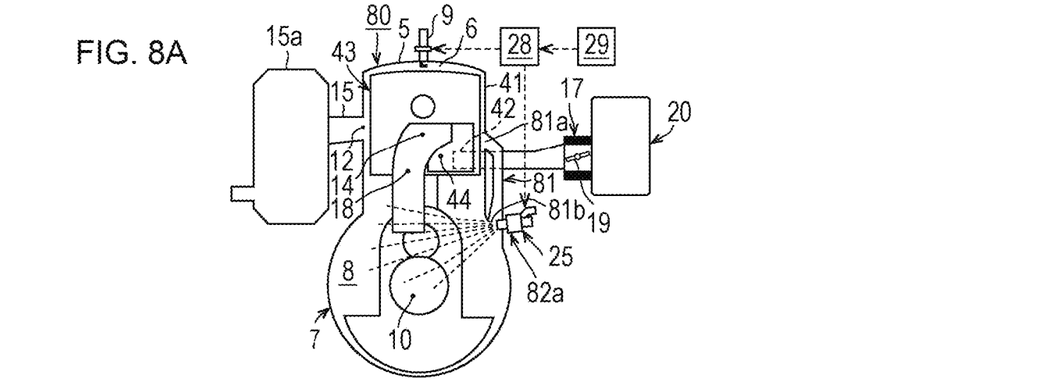
FIG. 8A is a schematic front view of the engine.
Figure 8B:
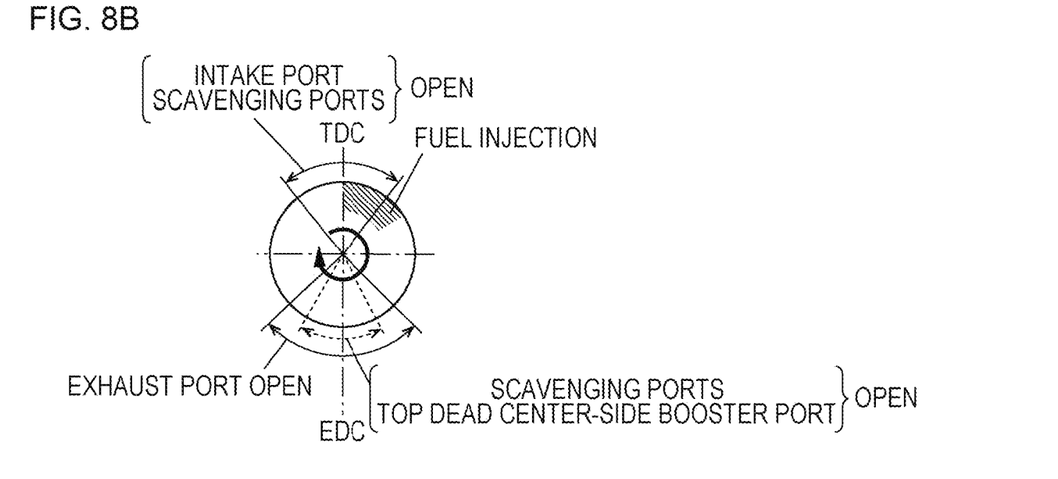
FIG. 8B is a diagram for illustrating fuel supply timing while the engine is performing the full-load operation.
Figure 8C:
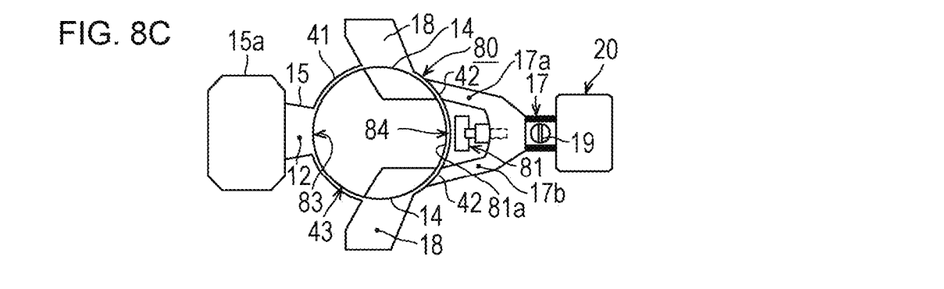
FIG. 8C is a schematic plan view of the engine.

As illustrated in FIG. 8C, the engine 80 has a pair of scavenging passages 18. As a result, an inner peripheral surface of the cylinder 41 has a pair of scavenging ports 14 that allow communication between the scavenging passages 18, 18 and the combustion chamber 6. The intake passage 17 branches into two branch paths 17a and 17b. The branch paths 17a and 17b communicate with the pair of intake ports 42, 42 of the cylinder 41, respectively. The intake ports 42, 42 are brought into communication with the scavenging ports 14, 14 at predetermined timing via two piston grooves 44, 44 formed in the peripheral surface of the piston 43, respectively.

Figure 9A:
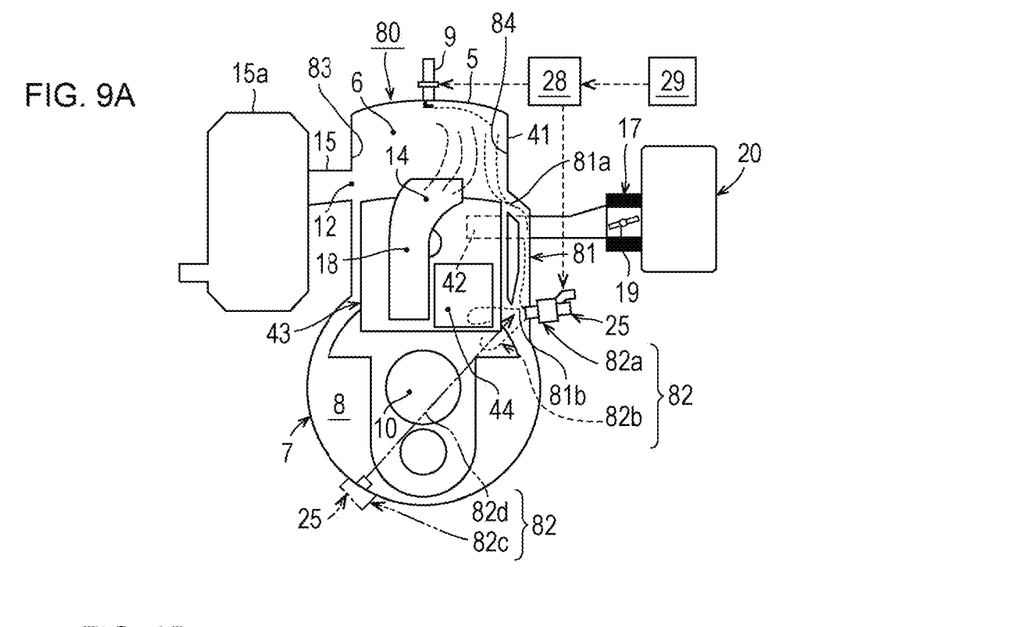
FIG. 9A is a schematic front view of the engine.

As illustrated in FIG. 8A and FIG. 9A, the engine 80 includes a booster passage 81 that allows communication between the crank chamber 8 and the combustion chamber 6. The booster passage 81 is separate from the pair of scavenging passages 18, 18. The booster passage 81 communicates with the combustion chamber 6 via a top dead center-side booster port 81a of the cylinder 41, and communicates with the crank chamber 8 via a bottom dead center-side booster port 81b of the crankcase 7. The booster passage 81 allows a fuel in the crank chamber 8 to flow into the combustion chamber 6 while the engine 80 is performing a light-load operation to thereby achieve stratified combustion. Specifically, the fuel in the crank chamber 8 flows into the combustion chamber 6 through the booster passage 81 while the engine 80 is performing the light-load operation. At the same time, air in the crank chamber 8 flows into the combustion chamber 6 through the scavenging passages 18, 18. In this manner, air and an air-fuel mixture are separately introduced into the combustion chamber 6 to achieve the stratified combustion.

In this embodiment, at least fuel supply timing of the fuel injection valve 25 is controlled by the control device 28 to achieve homogenous combustion during a full-load operation illustrated in FIG. 8A and FIG. 8B. Meanwhile, the fuel flows into the combustion chamber 6 through the booster passage 81 to achieve the stratified combustion during the light-load operation illustrated in FIG. 9A and FIG. 9B. In this manner, thermal efficiency is improved not only during the full-load operation but also during the light-load operation.

The fuel supply timing of the fuel injection valve 25 is controlled by the control device 28 so that fuel supply timing while the engine 80 is performing the full-load operation and fuel supply timing while the engine 80 is performing the light-load operation are set to be different from each other. Specifically, while the engine 80 is performing the full-load operation, the fuel is supplied from the fuel injection valve 25 at timing at which the piston 43 is located in the vicinity of the top dead center, as illustrated in FIG. 8B. This configuration allows the air-fuel mixture, which is generated as a result of mixture in the crank chamber 8, to be introduced from lower end sides of the scavenging passages 18, 18 into the combustion chamber 6. In this manner, during the full-load operation, homogeneity of the air-fuel mixture in the crank chamber 8 is improved, and hence such an air-fuel mixture is suitable for the homogeneous combustion.

Figure 9B:
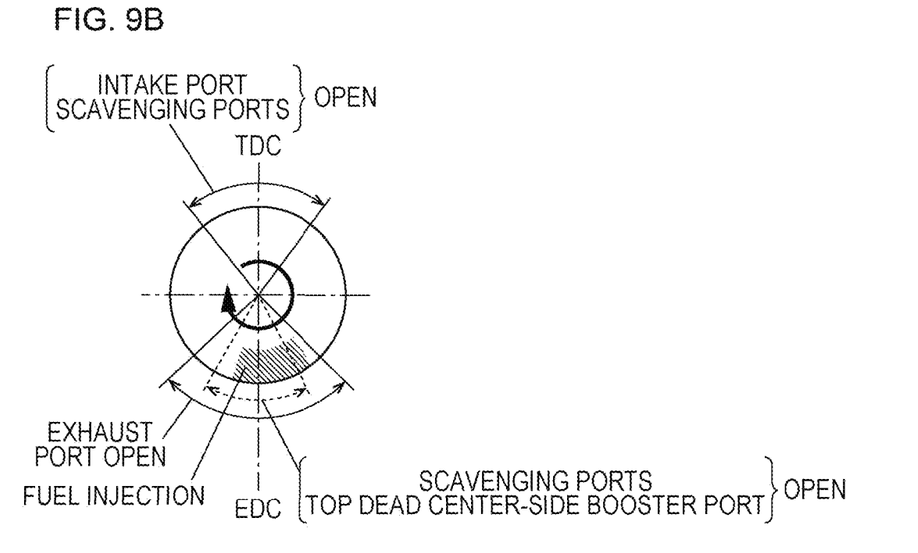
FIG. 9B is a diagram for illustrating fuel supply timing while the engine is performing the light-load operation.

Meanwhile, while the engine 80 is performing the light-load operation, the fuel is supplied, as illustrated in FIG. 9B, from the fuel injection valve 25 at timing at which the piston 43 is located on the bottom dead center side, more preferably, immediately before the piston 43 reaches the vicinity of the bottom dead center. As a result, during the light-load operation, the fuel supplied from the fuel injection valve 25 easily flows into the combustion chamber 6 through the booster passage 81 before being mixed with air in the crank chamber 8. The air, which has been supplied to the crank chamber 8, is introduced from the scavenging passages 18, 18 independently of the above-mentioned flow of the air-fuel mixture. As a result, an air layer and an air-fuel mixture layer are formed in the combustion chamber 6 to thereby achieve stratified combustion.

Preferably, the fuel injection of the fuel injection valve 25 is controlled by the control device 28 so that fuel injection while the engine 80 is performing the full-load operation and fuel injection while the engine 80 is performing the light-load operation are set to be different from each other. Specifically, while the engine 8 is performing the full-load operation, it is preferred that the fuel be powerfully and radially injected from the fuel injection valve 25, as illustrated in FIG. 8A. As a result, the fuel is easily scattered throughout the whole crank chamber 8. Thus, the fuel and the air are easily homogeneously mixed with each other in the entire space in the crank chamber 8.

Meanwhile, while the engine 80 is performing the light-load operation, it is preferred that the fuel be supplied from the fuel injection valve 25 so as to be injected to the vicinity of the bottom dead center-side booster port 81b. To achieve such fuel supply, the engine 80 includes a fuel supply configuration 82. The fuel supply configuration 82 positions the fuel supplied from the fuel injection valve 25 in the vicinity of the bottom dead center booster port 81b while the engine 80 is performing the light-load operation. The fuel supply configuration 82 cause the fuel to easily flow into the combustion chamber 6 through the booster passage 81 while the engine 80 is performing the light-load operation. Thus, this configuration is suitable for the stratified combustion during the light-load operation.

As a specific example of the fuel supply configuration 82, as illustrated in FIG. 9A, the fuel supply configuration 82 includes both a first configuration 82a and a second configuration 82b. The first configuration 82a allows the fuel injection valve 25 to be arranged in the vicinity of the bottom dead center-side booster port 81b. The second configuration 82b allows the fuel to be injected from the fuel injection valve at such an injection pressure that the fuel can reach and stay in the vicinity of the bottom dead center-side booster port 81b. As described above, the injection pressure of the fuel injection valve 25 is controlled by the control device 28.

As indicated by imaginary lines in FIG. 9A, another specific example of the fuel supply configuration 82 may include both a first configuration 82c and a second configuration 82d. The first configuration 82c allows the fuel injection valve 25 to be arranged so that the fuel is injected toward the bottom dead center-side booster port 81b. The second configuration 82d allows the fuel to be injected from the fuel injection valve 25 at such an injection pressure that the fuel can reach the bottom dead center-side booster port 81b. Also in this case, the injection pressure of the fuel injection valve 25 is controlled by the control device 28.

Next, a preferred positional relationship among the exhaust port, the two scavenging ports, and the top dead center-side booster port is described. As illustrated in FIG. 8C, the inner peripheral surface of the cylinder has the two scavenging ports. The exhaust port 12 is arranged on one arc-shaped surface side of the inner peripheral surface of the cylinder, which is located between the two scavenging ports 14,14. The top dead center-side booster port 81a is arranged on another arc-shaped surface side of the inner peripheral surface of the cylinder, which is located between the two scavenging ports. An opening position of the top dead center-side booster port in an axial direction of the cylinder is only required to be lower than the exhaust port (bottom dead center side), and may be substantially the same height position as height positions of the scavenging ports.

The above-mentioned configuration allows the fuel to flow into the combustion chamber through the booster passage and the air to flow from the two scavenging ports into the combustion chamber during the light-load operation. The fuel flowing into the combustion chamber through the booster passage is a rich fuel containing little air. Further, the air flowing from the two scavenging ports into the combustion chamber contains little fuel. As illustrated in FIG. 9A, the fuel flowing from the top dead center-side booster port into the combustion chamber is carried away with the air flowing from the two scavenging ports into the combustion chamber along the another arc-shaped surface of the inner peripheral surface of the cylinder in a direction toward a cylinder head. As described above, the separate introduction of the air and the air-fuel mixture into the combustion chamber 6 further improves stability of the stratified combustion during the light-load operation.

It is apparent that the configuration that includes the booster passage and controls the fuel supply timing from the fuel injection valve to achieve the stratified combustion during the light-load operation is applicable not only to the embodiment illustrated in FIGS. 8A to 8C and FIGS. 9A and 9B but also to the embodiments of FIG. 1 to FIG. 7.

It is important for the above-mentioned engine to more precisely control a ratio of the air supplied from the intake passage and the air-fuel mixture containing fuel components supplied by the fuel injection device. For this purpose, it is desired that a well-known check valve (see the check valve 23 of FIG. 1) be provided in the intake passage, more preferably, in the vicinity of the intake port. The check valve prevents blow-back from the combustion chamber in a previous cycle from being mixed into the intake passage to thereby enable more precise management of the air supply amount and the fuel injection amount in a subsequent cycle.

The embodiments of this disclosure have been described in detail with reference to the drawings. However, a specific configuration is not limited to those of the embodiments described above. For example, changes in design without departing from the scope of this disclosure are encompassed in this disclosure. Further, technologies in the above-mentioned embodiments described above may be used in combination as long as there is no particular contradiction or problem in, for example, purpose and configuration.

The invention claimed is:

1. A two-stroke internal combustion engine, comprising:
a cylinder, which defines a combustion chamber, and has an exhaust port;
an ignition device configured to ignite an air-fuel mixture in the combustion chamber;
a piston configured to reciprocate inside the cylinder through combustion and expansion that occur in the combustion chamber;
a crank chamber communicating with an interior of the cylinder;
a crankshaft, which is disposed in the crank chamber, and is operationally coupled to the piston;
a fuel injection valve configured to inject a fuel into the crank chamber;
an intake passage configured to allow only air to be sucked thereinto under a negative pressure generated when the piston is actuated; and
a scavenging passage that allows communication between the crank chamber and the combustion chamber,
wherein
air passing through the intake passage is introduced into the scavenging passage, and air stagnant in the scavenging passage at end of air suction contributes to scavenging,
the fuel injection valve comprises a high-pressure fuel injection valve configured to receive a fuel pressure from at least one of an electrically-driven fuel pump or a pump configured to operate through rotation of the crankshaft, and
the fuel injection valve is configured to inject the fuel at high pressure toward an area required to be cooled in the cylinder or the crank chamber.

2. The two-stroke internal combustion engine according to claim 1, wherein the piston has a piston groove, and an intake port and the scavenging passage communicate with each other via the piston groove.

3. The two-stroke internal combustion engine according to claim 2, wherein the piston groove has a hole that allows communication with the crank chamber.

4. The two-stroke internal combustion engine according to claim 3, further comprising a communication portion, which is defined between a lower end of the piston and a lower end of the intake port, and allows communication between the intake passage and the crank chamber.

5. The two-stroke internal combustion engine according to claim 4, further comprising a cutout in a lower end of the piston, wherein the cutout forms the communication portion.

6. The two-stroke internal combustion engine according to claim 4, further comprising an enlarged portion being enlarged in a downward direction at a lower end of the intake port, wherein the enlarged portion forms the communication portion.

7. The two-stroke internal combustion engine according to claim 2, wherein the scavenging passage has a branch passage communicating with the piston groove, and the branch passage is closer to the crank chamber than a scavenging port is.

8. The two-stroke internal combustion engine according to claim 1, wherein the fuel injection valve is configured to inject the fuel in such a direction as to avoid hinderance of inflow of air into the crank chamber.

9. The two-stroke internal combustion engine according to claim 1, wherein the high-pressure fuel injection valve is configured to inject the fuel when the crank chamber has a maximum internal pressure while the piston is being actuated.

10. The two-stroke internal combustion engine according to claim 1, wherein the intake passage has an opening coupled to only one intake port.

11. The two-stroke internal combustion engine according to claim 1, further comprising a booster passage, which allows communication between the crank chamber and the combustion chamber, and is separate from the scavenging passage.

12. The two-stroke internal combustion engine according to claim 11, further comprising:
a bottom dead center-side booster port that allows communication between the crank chamber and the booster passage; and
a fuel supply configuration that allows the fuel supplied from the fuel injection valve to be introduced to a vicinity of the bottom dead center-side booster port during a light-load operation.

13. The two-stroke internal combustion engine according to claim 12, wherein the fuel supply configuration includes both of a first configuration that allows the fuel injection valve to be arranged in the vicinity of the bottom dead center-side booster port and a second configuration that allows the fuel to be injected from the fuel injection valve at such an injection pressure that the fuel is allowed to reach and stay in the vicinity of the bottom dead center-side booster port.

14. The two-stroke internal combustion engine according to claim 12, wherein the fuel supply configuration includes both of a first configuration that allows the fuel injection valve to be arranged so that the fuel is injected toward the bottom dead center-side booster port and a second configuration that allows the fuel to be injected from the fuel injection valve at such an injection pressure that the fuel is allowed to reach the bottom dead center-side booster port.

15. The two-stroke internal combustion engine according to claim 11, wherein the fuel is supplied from the fuel injection valve at timing at which the piston is positioned in a vicinity of a top dead center during a full-load operation, and the fuel is supplied from the fuel injection valve at timing immediately before the piston reaches a vicinity of a bottom dead center during a light-load operation.

16. The two-stroke internal combustion engine according to claim 11, further comprising a pair of scavenging ports, which are formed in an inner peripheral surface of the cylinder, and allow communication between the scavenging passage and the combustion chamber,
wherein the exhaust port is arranged on one arc-shaped surface side between the pair of scavenging ports, and a top dead center-side booster port that allows communication between the combustion chamber and the booster passage is arranged on another arc-shaped surface side between the pair of scavenging ports.

17. The two-stroke internal combustion engine according to claim 1, further comprising a check valve in the intake passage.

18. An engine working machine, comprising a two-stroke internal combustion engine as a power source, wherein the two-stroke internal combustion engine includes:

a cylinder, which defines a combustion chamber, and has an exhaust port;
an ignition device configured to ignite an air-fuel mixture in the combustion chamber;
a piston configured to reciprocate inside the cylinder through combustion and expansion that occur in the combustion chamber;
a crank chamber communicating with an interior of the cylinder;
a crankshaft, which is disposed in the crank chamber, and is operationally coupled to the piston;
a fuel injection valve configured to inject a fuel into the crank chamber;
an intake passage configured to allow only air to be sucked thereinto under a negative pressure generated when the piston is actuated; and
a scavenging passage that allows communication between the crank chamber and the combustion chamber,
wherein
air passing through the intake passage is introduced into the scavenging passage, and air stagnant in the scavenging passage at end of air suction contributes to scavenging,
the fuel injection valve comprises a high-pressure fuel injection valve configured to receive a fuel pressure from at least one of an electrically-driven fuel pump or a pump configured to operate through rotation of the crankshaft, and
the fuel injection valve is configured to inject the fuel at high pressure toward an area required to be cooled in the cylinder or the crank chamber.

19. A two-stroke internal combustion engine, comprising:
a cylinder, which defines a combustion chamber, and has an exhaust port;
an ignition device configured to ignite an air-fuel mixture in the combustion chamber;
a piston configured to reciprocate inside the cylinder through combustion and expansion that occur in the combustion chamber;
a crank chamber communicating with an interior of the cylinder;
a crankshaft, which is disposed in the crank chamber, and is operationally coupled to the piston;
a fuel injection valve configured to inject a fuel into the crank chamber;
an intake passage configured to allow only air to be sucked thereinto under a negative pressure generated when the piston is actuated; and
a scavenging passage that allows communication between the crank chamber and the combustion chamber,
wherein
air passing through the intake passage is introduced into the scavenging passage, and air stagnant in the scavenging passage at end of air suction contributes to scavenging,
the piston has a piston groove, and an intake port and the scavenging passage communicate with each other via the piston groove, and
the scavenging passage has a branch passage communicating with the piston groove, and the branch passage is closer to the crank chamber than a scavenging port is.

* * * * *